(12) United States Patent
Thielen et al.

(10) Patent No.: US 6,662,840 B2
(45) Date of Patent: Dec. 16, 2003

(54) RUBBER STOCK FOR BEAD WIRE COMPOUNDS

(75) Inventors: Georges Marcel Victor Thielen, Schouweiler (LU); Filomeno Gennaro Corvasce, Mertzig (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/072,771

(22) Filed: Feb. 8, 2002

(65) Prior Publication Data

US 2002/0193520 A1 Dec. 19, 2002

Related U.S. Application Data

(60) Provisional application No. 60/275,321, filed on Mar. 13, 2001.

(51) Int. Cl.$^7$ ................................................. B60C 1/00
(52) U.S. Cl. ...................... 152/547; 152/450; 152/565; 525/133; 525/138; 525/139; 525/142; 525/143
(58) Field of Search ................................. 525/133, 138, 525/139, 142, 143; 152/450, 547, 565

(56) References Cited

U.S. PATENT DOCUMENTS 2,916,471 A    12/1959    Koln-Flittard et al. ........ 260/43
5,229,459 A    7/1993    Sandstrom et al. ......... 525/136

FOREIGN PATENT DOCUMENTS

| EP | 0401796 | 12/1990 | ........... C08L/61/10 |
| EP | 1075966 | 2/2001 | ............. B60C/1/00 |

OTHER PUBLICATIONS

European Search Report.

*Primary Examiner*—Patricia A. Short
(74) *Attorney, Agent, or Firm*—John D. DeLong

(57) ABSTRACT

The present invention relates to a rubber stock for bead wire compounds comprising (A) based on 100 parts by weight of rubber
  (1) from about 5 to about 40 weight percent of a carboxylated acrylonitrile-diene rubber having an acrylonitrile content ranging from about 15 to 45 percent by weight; and
  (2) from about 60 to about 95 weight percent of a non-carboxylated rubber selected from the group consisting of natural rubber, polyisoprene, polybutadiene, styrene-butadiene rubber, styrene-isoprene-butadiene rubber, styrene-isoprene rubber, isoprene-butadiene rubber and mixtures thereof;

(B) from about 0.1 to about 10 phr of a methylene acceptor; and (C) from about 0.1 to about 10 phr of a methylene donor.

12 Claims, No Drawings

US 6,662,840 B2

RUBBER STOCK FOR BEAD WIRE COMPOUNDS

The Applicants hereby incorporate by reference prior U.S. Provisional Application Serial No. 60/275,321, filed on Mar. 13, 2001.

BACKGROUND OF THE INVENTION

"Bead" as used herein means that part of a tire comprising an annular tensile member wrapped by ply cords and shaped, with or without other reinforcement elements such as flippers, chippers, apexes, toe guards and chafers, to fit the design rim.

A frequent problem in making a tire having a bead is maintaining good adhesion between the rubber and the bead. A conventional method in promoting the adhesion between the rubber and the reinforcement in the bead is to pre-treat the reinforcing wire with a mixture of a rubber latex and a phenol-formaldehyde condensation product wherein the phenol is almost always resorcinol. This is the so-called "RFL" (resorcinol-formaldehyde-latex) method. An alternative method of promoting such adhesion is to generate the resin in-situ (in the vulcanized rubber/textile matrix) by compounding a phenol-formaldehyde condensation product (hereinafter referred to as the "in-situ method"). The components of the condensation product consist of a methylene acceptor and a methylene donor. The most common methylene donors include N-(substituted oxymethyl) melamine, hexamethylene tetramine or hexamethoxy methyl melamine. A common methylene acceptor is a dihydroxy benzene compound such as resorcinol. The in-situ method has been found to be fairly effective where the reinforcing material is steel wire since pre-treatment of the wire with the RFL system has been observed as being largely ineffective. Unfortunately, the products using the in-situ method has still fallen short of the demands of the consumer.

The purpose of the present invention is to further improve the adhesion between the wire reinforcement in the bead and its rubber environment to satisfy this shortcoming in the existing technology.

SUMMARY OF THE INVENTION

The present invention relates to rubber stocks particularly suited for bead wire compounds for use in tires. The rubber stock of the present invention is characterized by having two or more diene rubbers. At least one of the diene rubbers is a carboxylated acrylonitrile-diene rubber having an acrylonitrile content ranging from about 15 to 45 percent by weight. The rubber stock also contains a methylene acceptor and methylene donor.

In addition, there is disclosed a pneumatic tire having a pair of beads where the beads are coated with the bead wire compound of the present invention.

DETAILED DESCRIPTION OF THE PREFERRED EMBODIMENT

There is disclosed a rubber stock for bead wire compounds comprising
  (A) based on 100 parts by weight of rubber
    (1) from about 5 to about 40 weight percent of a carboxylated acrylonitrile-diene rubber having an acrylonitrile content ranging from about 15 to 45 percent by weight; and
    (2) from about 60 to about 95 weight percent of a non-carboxylated rubber selected from the group consisting of natural rubber, polyisoprene, polybutadiene, styrene-butadiene rubber, styrene-isoprene-butadiene rubber, styrene-isoprene rubber, isoprene-butadiene rubber and mixtures thereof;
  (B) from about 0.1 to about 10 phr of a methylene acceptor; and
  (C) from about 0.1 to about 10 phr of a methylene donor.

One essential component contained in the present invention is a carboxylated acrylonitrile rubber. Based on 100 parts by weight of the total rubber in the rubber composition, from 5 to 40 parts by weight, is the carboxylated acrylonitrile rubber. Preferably, from 10 to 20 parts by weight is the carboxylated acrylonitrile rubber.

The present invention involves the use of a carboxylated acrylonitrile rubber or carboxylated acrylonitrile/diene polymer having an acrylonitrile content ranging from about 15 to about 45 percent by weight. Preferably, the acrylonitrile (ACN) content ranges from 18 to 35 percent by weight. The acrylonitrile/diene copolymers are intended to include acrylonitrile/butadiene copolymers and acrylonitrile/isoprene copolymers.

The carboxylated nitrile rubbers contain chain linkages derived from unsaturated carboxylic acids of the acrylic acid type (unsaturated carboxylic acid monomers). Some representative examples of unsaturated carboxylic acids of the acrylic acid type include acrylic acid, methacrylic acid, sorbic acid, β-acryloxypropanoic acid, ethacrylic acid, 2-ethyl-3-propyl acrylic acid, vinyl acrylic acid, cinnamic acid, maleic acid, fumaric acid and the like. Carboxylated nitrile rubbers generally contain from about 0.75 percent to 15 percent by weight chain linkages (repeat units) which are derived from unsaturated carboxylic acid monomers.

The carboxylic nitrile rubbers can be synthesized using any conventional polymerization technique. Emulsion polymerization of carboxylated nitrile elastomers is generally preferred and is used almost exclusively in industrial production. This type of a synthesis generally utilizes a charge composition comprising water, monomers, an initiator and an emulsifier (soap). Such polymerizations can be run over a very wide temperature range from about 0° C. to as high as 100° C. It is more preferred for these polymerizations to be run at a temperature from about 5° C. to 60° C.

The amount of carboxylic acid monomer (unsaturated carboxylic acid of the acrylic acid type) incorporated in a carboxylated nitrile rubber may be varied over a wide range. The monomer charge ratio between the carboxylic monomer and the comonomers employed in a polymerization may also be varied over a very wide range. Generally, the charge composition used in the synthesis of carboxylated nitrile rubbers will contain 60 percent to 75 percent by weight butadiene, 15 percent to 40 percent by weight of acrylonitrile and 1 percent to 15 percent by weight methacrylic acid, based upon the total monomer charge. A typical charge composition for a carboxylated nitrile rubber will contain 65 to 69 weight butadiene, 24 to 28 weight percent acrylonitrile and 5 to 9 weight percent methacrylic acid.

The emulsifiers used in the polymerization of such polymers may be charged at the outset of the polymerization or may be added incrementally or by proportioning as the reaction proceeds. Generally, anionic emulsifier systems provide good results; however, any of the general types of anionic, cationic or nonionic emulsifiers may be employed in the polymerization.

Among the anionic emulsifiers that can be employed in emulsion polymerizations are fatty acids and their alkali metal soaps such as caprylic acid, capric acid, pelargonic acid, lauric acid, undecylic acid, myristic acid, palmitic acid, margaric acid, stearic acid, arachidic acid and the like; amine soaps of fatty acids such as those formed from ammonia, mono- and dialkyl amines, substituted hydrazines, guanidine and various low molecular weight diamines; chain-substituted derivatives of fatty acids such as those having alkyl substituents; naphthenic acids and their soaps and the like; sulfuric esters and their salts, such as the tallow alcohol sulfates, coconut alcohol sulfates, fatty alcohol sulfates, such as oleyl sulfate, sodium lauryl sulfate and the like; sterol sulfates; sulfates of alkylcyclohexanols, sulfation products of lower polymers of ethylene as $C_{10}$ to $C_{20}$ straight chain olefins, and other hydrocarbon mixtures, sulfuric esters of aliphatic and aromatic alcohols having intermediate linkages, such as ether, ester or amide groups such as alkylbenzyl (polyethyleneoxy) alcohols, the sodium salt or tridecyl ether sulfate; alkane sulfonates, esters and salts, such as alkylchlorosulfonates with the general formula $RSO_2Cl$, wherein R is an alkyl group having from 1 to 20 carbon atoms, and alkylsulfonates with the general formula $RSO_2$—OH, wherein R is an alkyl group having from 1 to 20 carbon atoms; sulfonates with intermediate linkages such as ester and ester-linked sulfonates such as those having the formula $RCOOC_2H_4SO_3H$ and $ROOC—CH_2—SO_3H$, wherein R is an alkyl group having from 1 to 20 carbon atoms such as dialkyl sulfosuccinates; ester salts with the general formula:

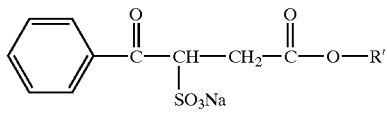

wherein R' is an alkyl group having from 1 to 20 carbon atoms; alkaryl sulfonates in which the alkyl groups contain preferably from 10 to 20 carbon atoms, e.g. dodecylbenzenesulfonates, such as sodium dodecylbenzenesulfonate; alkyl phenol sulfonates; sulfonic acids and their salts such as acids with the formula $R_6SO_3Na$, wherein R' is an alkyl and the like; sulfonamides, sulfamido methylenesulfonic acids; rosin acids and their soaps; sulfonated derivatives of rosin and rosin oil; and lignin sulfonates and the like.

Rosin acid soap has been used with good success at a concentration of about 5 percent by weight in the initial charge composition used in the synthesis of carboxylated elastomers. Of rosin acids, about 90 percent are isomeric with abietic acid and the other 10 percent is a mixture of dehydro abietic acid and dihydro abietic acid.

The polymerization of these carboxylated nitrile rubbers may be initiated using free radical catalysts, ultraviolet light or radiation. To ensure a satisfactory polymerization rate, uniformity and a controllable polymerization, free radical initiators are generally used with good results. Free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauroyl peroxide, cumene hydroperoxide, p-menthane hydroperoxide, t-butylhydroperoxide, acetyl acetone peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane and the like; the various alkyl perketals, such as 2,2-bis-(t-butylperoxy)butane, ethyl 3,3-bis(t-butylperoxy)butyrate, 1,1-di-(t-butylperoxy)cyclohexane and the like. Cumene hydroperoxide can be used as an initiator to obtain very good results in the polymerization of carboxylated nitrile rubber.

The emulsion polymerization system used in the synthesis of carboxylated nitrile rubbers can be treated at the desired degree of conversion with shortstopping agents, such as hydroquinone. Typical shortstopping agents will not interfere with the action of the succinic acid derivative salts as scorch inhibitors. Typical stabilizing agents and standard antioxidants can also be added to the emulsion of a carboxylated nitrile rubber.

After the emulsion polymerization has been completed, most conventional coagulating techniques for carboxylated nitrile rubbers can be employed. A review of coagulation techniques for nitrile rubbers is presented in Hofmann, Werner "Nitrile Rubber," *Rubber Chemistry and Technology*, Vol. 37, No. 2, Part 2 (April to June 1964), Pages 94 through 96, which is incorporated herein by reference. Normally such latexes are coagulated with reagents which ensure the preservation of the carboxyl groups of the elastomers as acidic moieties. Coagulation with acid or blends of salts with acids is usually very satisfactory. For example, sulfuric acid, hydrochloric acid, blends of sodium chloride with sulfuric acid and blends of hydrochloric acids with methanol are very effective as coagulating agents for carboxylated rubber emulsions. Calcium chloride solutions which are free of calcium hydroxide have also been used as coagulants with great success.

After coagulation, washing may be employed to remove excess soap and/or electrolyte from the carboxylated rubber. Sometimes washing is also useful in adjusting the pH of the carboxylated elastomer that has been synthesized. After washing, if it is desired, the elastomer can be dewatered. If it is desirable to do so, the carboxylated rubber can also be dried and baled after dewatering using conventional techniques.

An example of commercially available carboxylated nitrile rubber is CHEMIGUM® NX-775 (Bd/ACN-67/26 with 7 percent carboxylic acid) marketed by Nippon Zeon. This carboxylated copolymer contains approximately 0.5 to 10 percent by weight terminal carboxyl groups relative to the total amount of carboxylic acid.

From about 60 to about 95 weight percent of the total rubber in the rubber stock is a non-carboxylated rubber. Preferably, from 80 to 90 percent by weight of the total rubber is a non-carboxylated rubber.

Representative examples of non-carboxylated rubber which may be used include natural rubber, polyisoprene, polybutadiene, styrene-butadiene rubber, styrene-isoprene-butadiene rubber, styrene-isoprene rubber, isoprene-butadiene rubber and mixtures thereof. Preferably, the rubbers are natural rubber, styrene-butadiene rubber and polybutadiene.

According to an embodiment of the present invention, the rubber stock contains a "methylene donor" and a "methylene acceptor". The term "methylene acceptor" is known to those skilled in the art and is used to describe the reactant to which the methylene donor reacts to form what is believed to be a methylol monomer. The condensation of the methylol monomer by the formation of a methylene bridge produces the resin. The initial reaction that contributes the moiety that later forms into the methylene bridge is the methylene donor wherein the other reactant is the methylene acceptor. Representative compounds which may be used as a methylene acceptor are resorcinol, unmodified phenol novolak resins, modified phenol novolak resin, resorcinol novolak resins and mixtures thereof. Examples of modified phenol novolak resins include cashew nut oil modified phenol novolak resin, tall oil modified phenol novolak resin and alkyl modified phenol novolak resin.

The amount of methylene acceptor that is included in the rubber stock may vary depending on the type of rubber, the particular methylene acceptor, the particular methylene donor and the desired physical properties, i.e., adhesion and tear. Generally speaking, the amount of methylene acceptor may range from about 0.1 to about 10 phr. Preferably, the amount of methylene acceptor ranges from about 0.5 to about 5.0 phr.

The rubber stock of the present invention contains a methylene donor which is suitable for reaction with the methylene acceptor. Examples of methylene donors which are suitable for use in the present invention include hexamethylenetetramine, hexaethoxymethylmelamine, hexamethoxymethylmelamine, lauryloxymethoxypyridinium chloride, ethoxymethylpyridinium chloride, trioxan hexamethoxymethylmelamine, the hydroxy groups of which may be esterified or partially esterified, and polymers of the methylene donors may be N-substituted oxymethylmelamines of the formula:

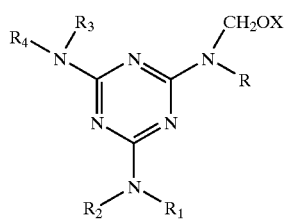

II wherein X is an alkyl having from 1 to 8 carbon atoms, R, $R_1$, $R_2$, $R_3$, and $R_4$ are individually selected from the group consisting of hydrogen, an alkyl having from 1 to 8 carbon atoms, the group —$CH_2OX$ or their condensation products. Specific methylene donors include hexakis-(methoxymethyl)melamine, N,N',N"-trimethyl/N,N',N"-trimethylolmelamine, hexamethylolmelamine, N,N',N"-dimethylolmelamine, N-methylolmelamine, N,N'-dimethylolmelamine, N,N',N"-tris(methoxymethyl)melamine and N,N'N"-tributyl-N,N',N"-trimethylolmelamine. The N-methylol derivatives of melamine are prepared by known methods.

The amount of methylene acceptor that is present in the rubber stock may vary depending on the type of rubber, the particular methylene acceptor, the particular methylene donor and the desired physical properties, i.e., adhesion and tear. Generally speaking, the amount of methylene donor may range from about 0.1 to about 10 phr. Preferably, the amount of methylene donor ranges from about 0.5 to about 5.0 phr.

The weight ratio of methylene donor to methylene acceptor can vary. Generally speaking, the weight ratio will range from about 1:10 to about 10:1. Preferably, the weight ratio ranges from about 1:3 to 3:1.

The term "phr" as used herein, and according to conventional practice, refers to "parts by weight of a respective material per 100 parts by weight of rubber, or elastomer."

The bead wire compound should contain a sufficient amount of filler to contribute a reasonably high modulus and high resistance to tear. The filler may be added in amounts ranging from 50 to 250 phr. Preferably, the filler is present in an amount ranging from 90 to 160 phr. Fillers include silica, carbon black, clays, calcium silicate and titanium dioxide. If carbon black is present, the amount of carbon black may vary. It is to be appreciated that a silica coupler may be used in conjunction with a carbon black, namely pre-mixed with a carbon black prior to addition to the rubber composition, and such carbon black is to be included in the aforesaid amount of carbon black for the rubber composition formulation.

The commonly employed siliceous pigments used in rubber compounding applications can be used as the silica in this invention, including pyrogenic and precipitated siliceous pigments (silica) and aluminosilicates, although precipitated silicas are preferred. The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the Journal of the American Chemical Society, Volume 60, page 304 (1930).

The silica may also be typically characterized by having a dibutylphthalate (DBP) absorption value in a range of about 100 to about 400, and more usually about 150 to about 300.

Further, the silica, as well as the aforesaid alumina and aluminosilicate may be expected to have a CTAB surface area in a range of about 100 to about 220. The CTAB surface area is the external surface area as evaluated by cetyl trimethylammonium bromide with a pH of 9. The method is described in ASTM D 3849 for set up and evaluation. The CTAB surface area is a well known means for characterization of silica.

Mercury surface area/porosity is the specific surface area determined by Mercury porosimetry. For such technique, mercury is penetrated into the pores of the sample after a thermal treatment to remove volatiles. Set-up conditions may be suitably described as using a 100 mg sample; removing volatiles during 2 hours at 105° C. and ambient atmospheric pressure; ambient to 2000 bars pressure measuring range. Such evaluation may be performed according to the method described in Winslow, Shapiro in ASTM bulletin, p.39 (1959) or according to DIN 66133. For such an evaluation, a CARLO-ERBA Porosimeter 2000 might be used.

The average mercury porosity specific surface area for the silica should be in a range of about 100 to 300 $m^2/g$.

A suitable pore-size distribution for the silica, alumina and aluminosilicate according to such mercury porosity evaluation is considered herein to be five percent or less of its pores have a diameter of less than about 10 nm; 60 to 90 percent of its pores have a diameter of about 10 to about 100 nm; 10 to 30 percent of its pores have a diameter of about 100 to about 1000 nm; and 5 to 20 percent of its pores have a diameter of greater than about 1000 nm.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2, VN3, BV3380GR, etc, and silicas available from Huber, for example Huber Sil 8745.

The silica fillers are used with sulfur containing organosilicon compounds. Examples of suitable sulfur containing organosilicon compounds are of the formula:

$$Z-Alk-S_n-Alk-Z \qquad III$$

in which Z is selected from the group consisting of

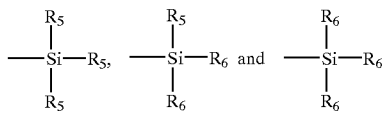

where $R_5$ is an alkyl group of 1 to 4 carbon atoms, cyclohexyl or phenyl; $R_6$ is alkoxy of 1 to 8 carbon atoms, or cycloalkoxy of 5 to 8 carbon atoms; Alk is a divalent hydrocarbon of 1 to 18 carbon atoms and n is from 2 to 8.

Specific examples of sulfur containing organosilicon compounds which may be used in accordance with the present invention include: 3,3"-bis(triethoxysilylpropl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(tethoxysilylpropyl) trisulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(tri-2"-ethylhexoxysilylpropyl) trisulfide, 3,3'-bis(triisooctoxysilylpropyl) tetrasulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, and 3,3'-bis(trimethoxysilyl-2-methylpropyl) tetrasulfide.

The preferred sulfur containing organosilicon compounds are the 3,3'-bis(trimethoxy or triethoxy silylpropyl) sulfides. The most preferred compound is 3,3'-bis(triethoxysilylpropyl) tetrasulfide. Preferably Z is

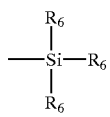

where $R_6$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 2 to 5.

The amount of the above sulfur containing organosilicon compound in a rubber composition will vary depending on the level of silica that is used. Generally speaking, the amount of the compound of formula III will range from 0.01 to 0.1 parts by weight per part by weight of the silica. Preferably, the amount will range from 0.04 to 0.08 parts by weight per part by weight of the silica.

Representative examples of reinforcing type carbon blacks(s), for this invention, include N326, N330, N332, N339, N343, N347, N351, N358, N375, N539, N550, N582, N650, N660, N683, N754, N762, N765, N774, and N787. Such types of carbon black are characterized through Iodine absorption ranging from 9 to 100 g/kg and DBP number ranging from 34 to 140 $cm^3/100$ g.

As known to one skilled in the art, in order to cure a rubber stock, one needs to have a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. The amount of sulfur vulcanizing agent will vary depending on the components of the rubber stock and the particular type of sulfur vulcanizing agent that is used. Generally speaking, the amount of sulfur vulcanizing agent ranges from about 0.1 to about 8 phr with a range of from about 1.5 to about 6 being preferred.

Conventional rubber additives may be incorporated in the rubber stock of the present invention. The additives commonly used in rubber stocks include plasticizers, curatives, processing oils, retarders, antiozonants, antioxidants and the like. Plasticizers are conventionally used in amounts ranging from about 2 to about 50 phr with a range of about 5 to about 30 phr being preferred. The amount of plasticizer used will depend upon the softening effect desired. Examples of suitable plasticizers include aromatic extract oils, petroleum softeners including asphaltenes, naphthenic oil, saturated and unsaturated hydrocarbons and nitrogen bases, coal tar products, cumarone-indene resins and esters such as dibutylphthalate and tricresyl phosphate. Materials used in compounding which function as an accelerator-activator includes metal oxides such as zinc oxide, magnesium oxide and litharge which are used in conjunction with acidic materials such as fatty acid, for example, stearic acid, oleic acid, murastic acid, and the like. The amount of the metal oxide may range from about 1 to about 10 phr with a range of from about 2 to about 8 phr being preferred. The amount of fatty acid which may be used may range from about 0.25 phr to about 5.0 phr with a range of from about 0.5 phr to about 2 phr being preferred.

Accelerators may be used to control the time and/or temperature required for vulcanization of the rubber stock. As known to those skilled in the art, a single accelerator may be used which is present in amounts ranging from about 0.2 to about 2.0 phr. In the alternative, combinations of two or more accelerators may be used which consist of a primary accelerator which is generally used in a larger amount (0.3 to about 2.0 phr), and a secondary accelerator which is generally used in smaller amounts (0.05 to about 0.50 phr) in order to activate and improve the properties of the rubber stock. Combinations of these accelerators have been known to produce synergistic effects on the final properties and are somewhat better than those produced by use of either accelerator alone. Delayed action accelerators also are known to be used which are not affected by normal processing temperatures and produce satisfactory cures at ordinary vulcanization temperatures. Suitable types of accelerators include amines, disulfides, guanidines, thioureas, thiazoles, thiurams, sulfenamides, dithiocarbamates and the xanthates. Examples of specific compounds which are suitable include zinc diethyl-dithiocarbamate, 4,4'-dithiodimorpholine, N,N-di-methyl-S-tert-butylsulfenyldithiocarbamate, tetramethylthiuram disulfide, 2,2'-dibenzothiazyl disulfide, butyraldehydeaniline mercaptobenzothiazole, N-oxydiethylene-2-benzothiazolesulfenamide and N-cyclohexyl-2-benzothiazolesulfenamide. Preferably, the accelerator is a sulfenamide.

A class of compounding materials known as scorch retarders are commonly used. Phthalic anhydride, salicyclic acid, sodium acetate and N-cyclohexyl thiophthalimide are known retarders. Retarders are generally used in an amount ranging from about 0.1 to 0.5 phr.

Preformed phenol-formaldehyde type resins may be used in the rubber stock and are generally present in an amount ranging from about 1.0 to about 5.0 phr, with a range of from about 1.5 to about 3.5 phr being preferred.

Conventionally, antioxidants and some times antiozonants, hereinafter referred to as antidegradants, are added to rubber stocks. Representative antidegradants include monophenols, bisphenols, thiobisphenols, polyphenols, hydroquinone derivatives, phosphites, thioesters, naphthyl amines, diphenyl-p-phenylenediamines, diphenylamines and other diaryl amine derivatives, para-phenylenediamines, quinolines and mixtures thereof. Specific examples of such antidegradants are disclosed in The Vanderbilt Rubber Handbook (1990), Pages 282 through 286. Antidegradants are generally used in amounts from about 0.25 to about 5.0 phr with a range of from about 1.0 to about 3.0 phr being preferred.

The rubber stock of the present invention has a particular utility in a composite with reinforcing material as a wire coat stock or ply coat stock. Examples of such composites include tires, belts or hoses. In particular, the rubber stock of the present invention has utility as a wire coat stock or ply coat stock for use in tires.

The present invention may be better understood by reference to the following example in which the parts or percentages are by weight unless otherwise indicated.

EXAMPLE

In this Example, a carboxylated NBR rubber was evaluated in a standard bead wire rubber formulation. The rubber compositions in Table 1 were prepared in a BR Banbury® using two separate stages of addition, namely, one non-productive mix stage and one productive mix stage. The non-productive stage was mixed for two minutes at a rubber temperature of 160° C. The drop temperature for the productive mix stage was 115° C.

The rubber compositions are identified as Samples A through C. Sample A is considered a control due to the absence of a carboxylated NBR.

TABLE 1

|  | Control Sample A | Sample B | Sample C |
| --- | --- | --- | --- |
| Non-productive Mix Stage |  |  |  |
| E-SBR[1] | 100 | 90 | 80 |
| COOH-NBR[2] | 0 | 10 | 20 |
| Resorcinol | 2.5 | 2.5 | 2.5 |
| Processing oil | 25 | 25 | 25 |
| Stearic acid | 3 | 3 | 3 |
| Silica[3] | 15 | 15 | 15 |
| Carbon black[4] | 125 | 125 | 125 |
| Zinc oxide | 5 | 5 | 5 |
| Productive Mix Stage |  |  |  |
| Accelerator[5] | 1.2 | 1.2 | 1.2 |
| Accelerator[6] | .2 | .2 | .2 |
| Hexamethylenetetramine | 1.5 | 1.5 | 1.5 |
| Sulfur | 4 | 4 | 4 |

[1] SBR 1502
[2] Chemigum ® NX775 from Nippon Zeon
[3] VN2 from Degussa S.A.
[4] N660
[5] Sulfenamide type
[6] Guanadine type

TABLE 2

|  | Control Sample A | Sample B | Sample C |
| --- | --- | --- | --- |
| Standard Bead Wire Adhesion[1] |  |  |  |
| Original (N) | 916 | 984 | 1073 |
| 2 days steam (N) | 585 | 778 | 936 |
| 7 days air (N) | 796 | 982 | 1169 |
| Stiffness |  |  |  |
| Shore D | 38 | 42 | 44 |
| E' at 25° C. Dynalizer (MPa)[2] | 17.6 | 29.8 | 39.9 |
| E' at 100° C. Dynalizer (MPa)[2] | 11.1 | 15 | 17 |
| 100% modulus | 10.3 | 10 | 10 |
| Tensile strength | 12 | 11 | 11 |
| Delta torque | 50.8 | 51.8 | 50.2 |
| T25 (150° C.) (min) | 5.69 | 5.5 | 5.64 |
| T90 (150° C.) (min) | 21.69 | 20.41 | 22.96 |
| Mooney viscosity ML 1 + 4/100° C. | 48.63 | 52.8 | 51.7 |
| Rebound at 100° C. | 56 | 49.1 | 43.5 |

[1] Performed at 10 minutes/155° C. cure. SBAT corresponds to ASTM D1871 Method 1. The pull out force in Newton of a bronze treated .94 mm bead wire is reported.
[2] The E' values at 25° C. and 100° C. measured with Dynalizer equipment from Barco Industries. The method involved indenting the sample with a spherical 3 mm diameter probe at a depth of 1 mm. The indentation time was 16 milliseconds. The E' is calculated from the registered stress relation curve.

As can be seen from the above data, Shore D and low strain modulus increase proportionally with the carboxylated NBR level. Original and aged standard bead wire adhesion increase proportionally with the carboxylated NBR level.

While certain representative embodiments and details have been shown for the purpose of illustrating the invention, it will be apparent to those skilled in this art that various changes and modifications may be made therein without departing from the spirit or scope of the invention.

What is claimed is:
1. A pneumatic tire having a pair of beads coated with a rubber stock compound comprising
 (A) based on 100 parts by weight of a rubber
  (1) from about 5 to about 40 weight percent of a carboxylated acrylonitrile-diene rubber having an acrylonitrile content ranging from about 15 to 45 percent by weight; and (2) from about 60 to about 95 weight percent of a non-carboxylated rubber selected from the group consisting of natural rubber, polyisoprene, polybutadiene, styrene-butadiene rubber, styrene-isoprene-butadiene rubber, styrene-isoprene rubber, isoprene-butadiene rubber and mixtures thereof;

(B) from about 0.1 to about 10 phr of a methylene acceptor; and (C) from about 0.1 to about 10 phr of a methylene donor.

2. The pneumatic tire of claim 1 wherein said carboxylated acrylonitrile-diene rubber contains from 18 to 35 weight percent of bound acrylonitrile.

3. The pneumatic tire of claim 1 wherein from 10 to 20 parts by weight of carboxylated acrylonitrile-diene rubber is present.

4. The pneumatic tire of claim 1 wherein said carboxylated acrylonitrile rubber contains from 0.75 to 15 percent by weight chain linkages which are derived from an unsaturated carboxylic acid monomer.

5. The pneumatic tire of claim 1 wherein said methylene acceptor is resorcinol, phenol novolak resins and resorcinol novolak resins.

6. The pneumatic tire of claim 1 wherein the methylene donor is selected from the group consisting of hexamethylene tetramine, hexamethoxymethyl melamine, lauryloxymethyl pyridinium chloride, ethyloxymethyl pyridinium chloride, trioxan hexamethylolmelamine and paraformaldehyde.

7. The pneumatic tire of claim 1 wherein the methylene donor is of the general formula:

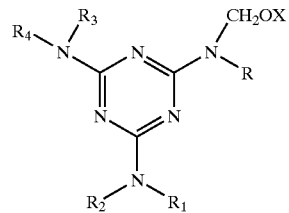

wherein X is an alkyl having from 1 to 8 carbon atoms, R, $R_1$, $R_2$, $R_3$, and $R_4$ are individually selected from the group consisting of hydrogen, an alkyl having from 1 to 8 carbon atoms, the group —$CH_2OX$ or their condensation products.

8. The pneumatic tire of claim 1 wherein the methylene donor is selected from the group consisting of hexakis (methoxymethyl)melamine, N,N',N"-trimethyl/ N,N',N"-trimethylolmelamine, hexamethylolmelamine, N,N',N"-dimethylolmelamine, N-methylolmelamine, N,N'-dimethylolmelamine, N,N',N"tris(methoxymethyl) melamine and N,N',N"tributyl-N,N',N"-trimethylolmelamine.

9. The pneumatic tire of claim 6 wherein said methylene donor is selected from the group consisting of hexamethylenetetramine, hexamethoxymethyl melamine and mixtures thereof.

10. The pneumatic tire of claim 1 wherein the weight ratio of methylene donor to the methylene acceptor ranges from 1:10 to about 10:1.

11. The pneumatic tire of claim 10 wherein the weight ratio of methylene donor to methylene acceptor ranges from about 1:3 to about 3:1.

12. The pneumatic tire of claim 1 wherein from about 80 to 90 weight percent of a non-carboxylated rubber.

\* \* \* \* \*